United States Patent Office 2,824,107
Patented Feb. 18, 1958

2,824,107

METHOD FOR MAKING METAL PHTHALO-CYANINE PIGMENTS

Edwin B. Newton and Henry J. Kehe, Akron, Ohio, assignors to The B. F. Goodrich Company, New York, N. Y., a corporation of New York No Drawing. Application September 28, 1954
Serial No. 458,948

10 Claims. (Cl. 260—314.5)

The present invention relates to a method for producing phthalocyanine colors or pigments. More particularly, the present invention relates to a novel method for catalyzing phthalocyanine forming materials to produce metal phthalocyanine coloring compounds or compositions.

"Catalysts" have long been used in the process of producing phthalocyanine pigments. Some of these materials are not strictly catalysts, for while catalyzing or promoting the reaction, they are altered during the reaction and usually cannot be recovered in their original condition and reused. However, such catalysts do not usually enter the phthalocyanine molecule and generally comprise a metal or metal compound in which the metal is usually different from the one found in the phthalocyanine pigment itself. Of the catalysts proposed in the past for the phthalocyanine reaction, the inorganic compounds and particularly the metal oxides have been used. The metal oxides are of particular interest since this form of the metal catalyst is the most abundant form found or obtained and hence would be most economical to use. However, it has been observed that the actual yields of phthalocyanine pigments using metal oxide catalysts are unfortunately considerably less than the expected or theoretical yield. Accordingly, it is a primary object of the present invention to provide a method of utilizing a metallic oxide in the phthalocyanine reaction which provides yields of pigment which are substantially theoretical.

It is another object of the present invention to provide a method for producing phthalocyanine pigments using as a catalyst a specially prepared metallic oxide selected from the group consisting of titanium and zirconium dioxides and characterized by providing high yields of metal phthalocyanine pigments.

These and other objects and advantages of the present invention will become more apparent to those skilled in the art from the following detailed description and examples.

It has now been found that high yields of metal phthalocyanine pigments can be obtained by employing in the phthalocyanine reaction to produce metal phthalocyanine pigments at least one hydrated mineral acid digested metallic oxide at least partially soluble in the nitrogen donor. In particular, hydrated acid digested titanium dioxide and zirconium dioxide, partially soluble in urea, are preferred owing to their ready availability and ease of preparation and to the high yields of pigment obtained when they are used as the catalysts.

The metallic oxides which are treated according to the present invention and used in the phthalocyanine reaction to produce pigments are any of the metal oxides customarily employed in the phthalocyanine reaction such as the oxides of antimony, arsenic, chromium, tin, titanium, tungsten, zirconium and the like and mixtures thereof, and which after acid digestion are hydrated and at least partially soluble in the nitrogen donor compound. Being at least partially soluble means that the metallic oxide catalyst, after being acid digested, will dissolve to some extent in the nitrogen donor which also acts as an electrolyte or flux for the reaction to furnish the required active centers necessary for catalysis to start. It is believed that acid digestion results in the formation of a metal complex or ion of the oxide which is soluble to some extent in the nitrogen donor. Such complexes may have the general formula $MeO^c$ where Me is a metal as described above, O is oxygen and c is the residual positive or negative charge(s). This ion or charged complex then catalyzes the reaction or may form an intermediate during the reaction which subsequently decomposes to form the phthalocyanine molecule or is replaced in the molecule by the metal donor. It is believed that it is only necessary to have a portion of the complex in solution at any given time to afford the necessary catalytic activity to the reaction. Whatever the true nature of the reaction may be, it has been found that unless the metal oxide is acid digested and hydrated before use in the reaction, high yields of good colors are not obtained.

Acid digestion of the metallic oxide may readily be accomplished by treatment of the metal oxide with a strong mineral acid such as a hydrohalogen acid, hydrochloric acid, an oxygenated halogen acid, perchloric acid, phosphoric acid, sulfuric acid and the like. The acids may be used in various concentrations and the time and temperature during acid digestion may vary over a wide range depending on the nature of the oxide, the concentration of the acid, etc. Generally, it is preferred to treat the oxide in strong acid, for example at least about 30% concentration, at relatively high temperatures below the decomposition point of the acid for several hours in order to activate as much of the metallic oxide as possible. The acid digested metallic oxide, that is, the metal oxide plus the acid and more or less water are added to the phthalocyanine reactants. Moreover, the amount of water present may vary in the acid solution to provide moist solids, slurries or solutions. It, of course, will be appreciated that large amount of water present with the acid digested metallic oxide will require longer periods of time to reach the reaction temperature in order to eliminate the water of solution, hydration and/or crystallization even though some water is given off during the course of the phthalocyanine reaction itself. However, it is a feature of the method of the present invention that the water initially present or produced during the reaction does not adversely affect the reaction, yields of pigment obtained nor the purity of the color. Moreover, it is another feature of the method of the present invention that moist solid catalysts having relatively little water can be used and thereby greatly reduce the initial heating-up period.

The catalyst is used in the reaction in a minor amount. However, for best results, there should be used at least about 1 mol of catalyst, computed as metallic ions, for every 4 mols of the phthalocyanine forming material or for every mol of the pigment obtained. Preferably, an excess over this amount is used. If an insufficient amount of catalyst is employed, the reaction procedes at a slower rate to produce smaller yields of product and larger particles of pigment as well as dirty colors which, of course, are to be avoided. Very large amounts of catalysts are unnecessary as no appreciable increase in conversion is realized. None of the metallic oxide catalyst is recoverable, however, at the end of the reaction in the hydrated acid digested and activated condition. Apparently, while the metal is in the form of an oxide, its catalytic activity has been changed or eliminated. Of the catalysts disclosed above it is preferred to employ mineral acid digested hydrated titanium dioxide or zirconium dioxide, and mixtures thereof, as a catalyst to obtain the highest yields and best colors and for ease in preparation.

The phthalocyanine forming material includes orthophthalic acid and its derivatives and mixtures thereof useful in producing phthalocyanine coloring matters or pigments. This term, thus, includes phthalic acid, phthalic anhydride, phthalic acid monoamide, phthaldiamide, phthalimide, phthalimimide, monoammonium phthalate, monoammonium o-carbamyl-benzoate, monoammonium o-cyano-benzoate, o-cyano-benzoic acid, o-cyano-benzamide, and the like. There are also to be included in this term the halogenated derivatives of the applicable compounds such as the mono, di, tri and tetrabromo or chloro phthalic acids, their derivatives, as well as the halogenated mono and diammonium salts, the anhydrides, imides, mono and diamides, imimides, the ortho-cyanobenzamides, the lower monoalkyl esters such as the methyl and ethyl esters and other halogenated derivatives of phthalic acid, and mixtures thereof. In place of halogen derivatives, the alkoxy derivatives of such compounds may be employed. The phthalocyanine forming material thus includes substituted and unsubstituted orthophthalic acid and its derivatives and mixtures thereof which are useful in forming phthalocyanine pigments varying generally from blue to green in color.

The phthalocyanine forming metal donor reagent which supplies metal ions under the conditions of the reaction can be any metal heretofore used for producing metal phthalocyanine pigments. In general, the polyvalent metals are used such as copper, nickel, iron, cobalt, vanadium, tin, chromium, lead and the like although other metals such as aluminum, cadmium, magnesium and zinc may also be employed successfully as metal donors. The free metal or its salt may be employed. The amount of metal donor employed is sufficient to obtain the desired amount of metal in the resulting pigment and usually will amount in moles to about a fourth of the amount of the phthalocyanine forming material used. Preferably a slight excess of the donor metal is provided in the reaction to insure that sufficient metal ions are present to enter the phthalocyanine molecule. Moreover, oxidizing agents such as permanganates may also be employed to oxidize the metals. Of the various metals employed it is preferable to employ copper as a donor in the form of copper chloride or copper nitrate to obtain the most useful pigment and highest yields.

Solvents suitable for the reaction producing phthalocyanine pigments are inert organic solvents having a sufficiently high boiling point, up to about 250° C., to remain liquid under the conditions of the reaction. Examples of such solvents are trichlorobenzene, chlorobenzene, dichlorobenzene, naphthalene and its chlorinated derivatives, quinoline, benzophenone, nitrobenzene, etc. Sufficient solvent is employed to dissolve or disperse the reactants and to maintain a liquid mass of some fluidity.

The nitrogen supplying material or donor used in the reaction may be urea, biuret, guanidine, guanylurea, dicyandiamide or cyanuric acid and the like. While the amount of the nitrogen donor can vary within a wide range, it is preferred to employ an excess over the theoretical amount necessary to form the phthalocyanine pigment since some of the nitrogen donor may decompose or react to produce ammonia which may escape from the system or be unavailable for producing the pigment and also because the excess amount of the nitrogen donor acts as a flux for the reaction and affords to the reaction mass a suitable consistency for manipulation and maintenance of homogeneity. Thus, the ratio in mols of the amount of the nitrogen donor to the phthalocyanine forming material may vary from about 1:1 to 5:1 or more. More preferably, from about 3 to 7 mols of the nitrogen donor per mol of the phthalocyanine forming material are used to provide optimum reaction conditions. However, where nitrogen derivatives of the phthalocyanine forming materials are used such as the imides, the amides, and the imimides, which already contain a portion of the nitrogen necessary for formation of the phthalocyanine molecule, smaller quantities of the nitrogen donor may be employed.

The reaction to produce the phthalocyanine materials of the present invention may be carried out in a vessel open to the atmosphere or in a vessel closed to develop autogenous pressure. The reaction vessel should be lined with a material which will not poison the reaction nor introduce amounts of deleterious materials to dirty the color of the pigment produced. Hence, the vessel should preferably be glass lined. The reaction vessel should also be fitted with an agitator and a reflux column if open to the air and a vent for the noncondensables.

The reactants may be added to the reaction vessel, singly or together, in any order; when solid, they are preferably first pulverized to insure a high rate of reaction. After introduction into the reaction vessel, the mixture can be heated quickly to the reaction temperature range of from about 150 to 250° C., preferably from about 175 to 185° C. to afford the best reaction rate and yield of pigment displaying satisfactory pigmental strength and brilliance. The time of heating at the reaction temperature will vary somewhat depending on the volume of the reaction mixture, the temperature, degree of agitation, and the like. Therefore, the time of heating is chosen to obtain the highest yield of the pigment. Extended reaction periods are uneconomical. Heating at the reaction temperature for more than about 3 hours fails to increase appreciably the yield of pigment. For a temperature range of about 175-185° C., the reaction time will vary from 1-3 hours. The mixture is constantly agitated during both the heat-up and the reaction periods.

At the end of the reaction period, the phthalocyanine pigment can be filtered hot or cold, and the filter cake obtained is leached with one or more solvents such as trichlorobenzene, benzene and ethanol to remove the original solvent and other materials soluble in the organic solvent. Instead of using benzene and ethanol, the trichlorobenzene remaining after washing can be removed by vacuum drying. After this solvent treatment or drying step, the filter cake is broken up and suspended in a weak solution of sulfuric acid which may be warmed, filtered and washed with water until the filtrate is about neutral. The filter cake is next treated with a dilute solution of caustic, filtered, washed until the filtrate again is about neutral and may be dried. The procedure of treating the phthalocyanine pigment filter cake first with dilute acid and then with dilute caustic is preferred since it was observed that, when the order of treatment was reversed, the caustic precipitated metallic hydroxides and oxides as dark protective films over small amounts of unreacted phthalocyanine forming material, nitrogen donor compounds or polymers and other substances. Further, the caustic liberated gaseous ammonia that induced troublesome frothing. Subsequent treatment with dilute acid removed the protective films from the suspended solids whereupon the nitrogen donor compounds or polymers dissolved. However, the unreacted phthalocyanine forming material remained to dilute the resulting pigment. Moreover, the acid pasting process did not remove the unreacted phthalocyanine forming material which remained to dilute the finished color. In contrast, the preferred order of refining the pigment eliminated the troublesome frothing caused by ammonia evolution during the caustic treatment and prevented unreacted phthalocyanine forming material from getting into the finished color. Any residual metal oxide remaining after the acid and caustic treatment steps may be removed by treating the pigment with strong (50%) $H_2SO_4$ filtering and washing until the filtrate is neutral.

During the reaction and during the refining steps, the by-products and unreacted starting materials, etc., obtained may be discharged to the atmosphere, to waste or to storage for refining and further use if desired.

The refined color can then be conditioned or finished by any one of a number of methods to prepare it for use. One procedure involves solution of the pigment, if soluble in acid, in about 10 parts of very strong sulfuric acid followed by pouring into sufficient crushed ice to give a final slurry containing about 15% acid. The pigment is separated from the slurry and the resulting pigment paste is washed and then either laked or dried as desired. Additionally or alternatively, the pigment may be ball milled in the presence of an organic diluent to obtain the desired particle size. Ball milling is especially useful in reducing the particle size of those pigments neither soluble in concentrated sulfuric acid nor responsive to acid pasting. After finishing, the pigment may then be treated with various oils, resins, etc., and incorporated with the usual compounding ingredients in paints, enamels, lacquers, plastics, such as rigid or plasticized polyvinyl chloride or copolymerized vinyl chloride-vinylidene chloride materials, rubbers, and the like, to color the same.

The following examples will serve to illustrate the invention with more particularity to those skilled in the art:

Example I

Titanium dioxide, $TiO_2$ (about 50 grams) and 2 mols of concentrated sulfuric acid (95%) were heated together to the temperature of incipient fuming on a hot plate with constant stirring for about 4 hours. At the end of the reaction, the hydrated acid digested titanium dioxide was cooled and a portion of the resulting stiff pasty mass was charged in the ratio set forth below to a reaction flask fitted with a stirrer and agitator. An analysis of the acid digested titanium dioxide disclosed that it contained about 20% $TiO_2$, about 30% $H_2O$ and about 50% $H_2SO_4$ and had an approximate formula as follows: $Ti(SO_4)_2 \cdot 9H_2O$ or $TiOSO_4$ (titanyl sulfate) plus 1 mol of $H_2SO_4$ and water. The other reactants were also added in the approximate proportions set forth below:

| Components | Grams | Mols | Mol Ratio |
|---|---|---|---|
| Trichlorobenzene | 865 | 4.5 | 22.5 |
| Tetrachlorophthalic anhydride | 57.2 | .2 | 1.0 |
| Urea | 80 | 1.3 | 6.67 |
| Cupric ions (from about 8 grams of $CuCl_2$) | | .056 | .28 |
| Titanyl ions (from 2.95 g. of $TiO^{++}$ contained in the above acid digested $TiO_2$) | | .0466 | .28 |

The mixture was then heated from room temperature to a temperature of about 175° C. with agitation. Heating of the mixture while agitated was then continued for 2½ hours during which time the temperature rose to 185° C. The reaction which is believed to have occurred can be represented by the following equation:

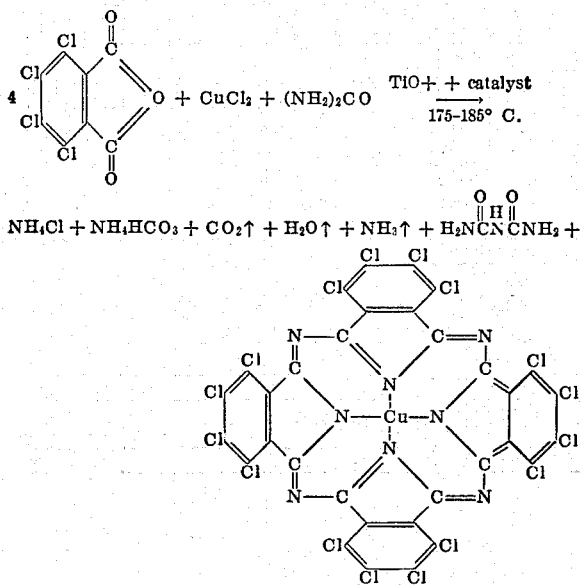

At the end of the reaction period, the heater was removed to allow the batch to cool naturally. The temperature fell rapidly (about 2° C. per minute); and when it had fallen below 140° C., the pigment was filtered off on a suction filter. Rinsings of the reaction vessel, agitator, thermometer and lid with trichlorobenzene were added to the filter. Small portions of fresh trichlorobenzene were then poured over the filter cake to displace the saturated trichlorobenzene. Two rinsings of the filter cake with benzene displaced the trichlorobenzene and two rinsings with ethanol displaced the benzene. The crude ethanol-wet cake was mashed into small lumps (¼" to ½") and added with moderate stirring to dilute sulfuric acid (2 liters of 2% acid in a 4 liter beaker) at about 50° C. The slurry was warmed to 85° C. as promptly as possible (about 1 hour on an electric hotplate) and kept at 85 to 95° C. for 2 hours, adding make-up water from time to time. The temperature was kept at 95° C. or below to avoid stabilization of gas bubbles, due to gas-vapor-steam evolution, by the pigment particles and to forestall a rapid increase in volume and a consequent overflow. At the end of the period, the mixture was filtered by suction. Washing of the cake with hot tap water was continued until the filtrate tested to a pH of 5–7. Next, the filter cake was mashed and added to dilute sodium hydroxide solution (2 liters of 2% base in a 4 liter beaker) using the same temperature and time limits set forth above with respect to the acid treatment step. Washing of the caustic treated filter cake was complete when the final rinsing filtrate tested to a pH of 7–8. The washed filter cake was then dried and weighed. The yield of pigment was about 90.0% of the theoretical yield. The same experiment was repeated except that the hydrated acid digested titanium dioxide catalyst was replaced in one case with titanium dioxide, in a second case with a mixture of titanium dioxide and water and in a third case with a mixture of unheated, undigested titanium dioxide and concentrated sulfuric acid. In all three cases no amount or no useful amount of pigment was obtained. When the titanium dioxide catalyst was omitted and sulfuric acid alone used as catalyst in the reaction, no pigment was obtained. Hence, it is apparent that sulfuric acid alone or the crystalline forms of $TiO_2$ even in the presence of acid do not have the requisite catalytic activity for converting the phthalocyanine forming materials into phthalocyanine pigments as exhibited by the hydrated, mineral acid digested titanium dioxide.

Example II

The method of this example was the same as Example I, above, except that zirconium dioxide was digested with concentrated sulfuric acid instead of titanium dioxide and the resulting hydrated, acid digested zirconium dioxide was used as a catalyst. The yield of pigment was about 85% of the theoretical. This example illustrates that other metal oxides can be mineral acid digested to obtain catalytic activity so that they are useful in the phthalocyanine synthesis.

Example III

The method of this example was the same as Example I, above, except that cupric nitrate was used in place of cupric chloride as the metal donor reagent; the proportions of the components of the reaction mixture were varied somewhat; and the reaction slurry was vacuum filtered in a ceramic filter crock, reslurried with hexane and vacuum filtered instead of being treated with trichlorobenzene, benzene and ethanol and dried. Then the dried pigment was treated with acid and caustic as in Example I. The approximate proportions of the ingredients and the yield obtained are set forth below:

| Components | Parts by Weight |
|---|---|
| Trichlorobenzene | 182.50 |
| Tetrachlorophthalic anhydride | 9.65 |
| Urea | 13.45 |
| Cupric nitrate, trihydrate $(Cu(NO_3)_2 \cdot 3H_2O)$ | 2.26 |
| Sulfuric acid digested titanium dioxide (about 20% $TiO_2$, 30% $H_2O$ and 50% $H_2SO_4$) | 3.13 |

The yield of pigment was about 93.2% of the theoretical yield. Repeating the foregoing method of Example III gave yields of from about 91.7 to 95% of the theoretical yield.

In summary, the present invention teaches that the catalytic activity of metallic oxides, and especially titanium dioxide and zirconium dioxide, in the phthalocyanine reaction can be enhanced greatly by acid digestion of the metallic oxide with a mineral acid prior to use in the reaction. These catalysts have high activity and are non-corrosive. The actual yields of pigment obtained approach the theoretical and the pigments themselves are clean and pure. Moreover, the method of the present invention is easily practiced and does not require special equipment. Hence, it is apparent that the present invention affords a method to greatly reduce the cost of obtaining phthalocyanine pigments.

What is claimed is:

1. The method for producing metal phthalocyanine pigments which comprises heating in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount, computed as metallic ions and as compared to the other reactants present and sufficient to catalyze the phthalocyanine reaction to form said pigment, of at least one hydrated mineral acid digested oxide at least partially soluble in said nitrogen donor and of an element selected from the group consisting of titanium and zirconium and mixtures thereof to a temperature and for a time sufficient to form a phthalocyanine pigment.

2. The method of producing metal phthalocyanine pigments which comprises heating with agitation in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one hydrated mineral acid digested oxide at least partially soluble in said nitrogen donor and of an element selected from the group consisting of titanium and zirconium and mixtures thereof to a temperature of from about 150 to 250° C. and for a period of time sufficient to form a phthalocyanine pigment.

3. The method for producing metal phthalocyanine pigments which comprises mixing together an inert organic high boiling point solvent, a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one hydrated mineral acid digested oxide at least partially soluble in said nitrogen donor and of an element selected from the group consisting of titanium and zirconium and mixtures thereof to form a mixture, slowly heating said mixture while agitating the same to a temperature of from about 175 to 185° C., heating and agitating said mixture at said temperature for from 1 to 3 hours to form said pigment and separating the pigment produced from the reaction mixture.

4. The method for producing metal phthalocyanine pigments according to claim 2 containing the additional steps of filtering the phthalocyanine pigment reaction mass to obtain a filter cake, washing the filter cake successively with an organic solvent, dilute mineral acid and dilute inorganic base, and removing said solvent, acid and base from said cake after each washing step.

5. The method for producing metal phthalocyanine pigments according to claim 4 where said catalyst is hydrated sulfuric acid digested titanium dioxide.

6. The method for producing metal phthalocyanine pigments according to claim 4 where said catalyst is hydrated sulfuric acid digested zirconium dioxide.

7. The method for producing metal phthalocyanine pigments according to claim 4 where said phthalocyanine metal forming donor reagent is copper chloride.

8. The method for producing metal phthalocyanine pigments according to claim 4 where said phthalocyanine metal forming donor reagent is copper nitrate.

9. The method for producing metal phthalocyanine pigments according to claim 4 where said phthalocyanine forming material is tetrachlorophthalic anhydride.

10. The method for producing metal phthalocyanine pigments which comprises reacting at a temperature of from about 175 to 185° C. for about 2½ hours the following ingredients in the ratios and parts by weight named: about 183 parts of trichlorobenzene, about 9.7 parts of tetrachlorophthalic anhydride, about 13.5 parts of urea, about 2.3 parts of cupric nitrate, trihydrate (Cu(NO$_3$)$_2$·3H$_2$O) and about 3.1 parts of sulfuric acid digested titanium dioxide (about 20% TiO$_2$, 30% H$_2$O and 50% H$_2$SO$_4$).

References Cited in the file of this patent

UNITED STATES PATENTS

| | | |
|---|---|---|
| 2,276,598 | Stocker et al. | Mar. 17, 1942 |
| 2,410,301 | O'Neal | Oct. 29, 1946 |
| 2,549,842 | Moser | Apr. 24, 1951 |
| 2,662,896 | Pedersen | Dec. 15, 1953 |
| 2,727,043 | Rosch et al. | Dec. 13, 1955 |